Jan. 4, 1944. C. S. ASH 2,338,393
DUAL WHEEL ASSEMBLY
Original Filed Sept. 1, 1939
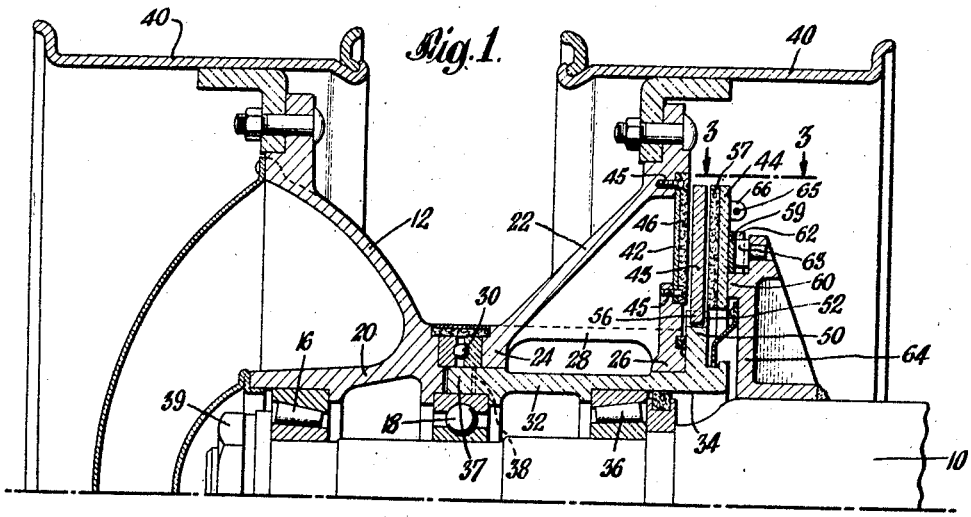
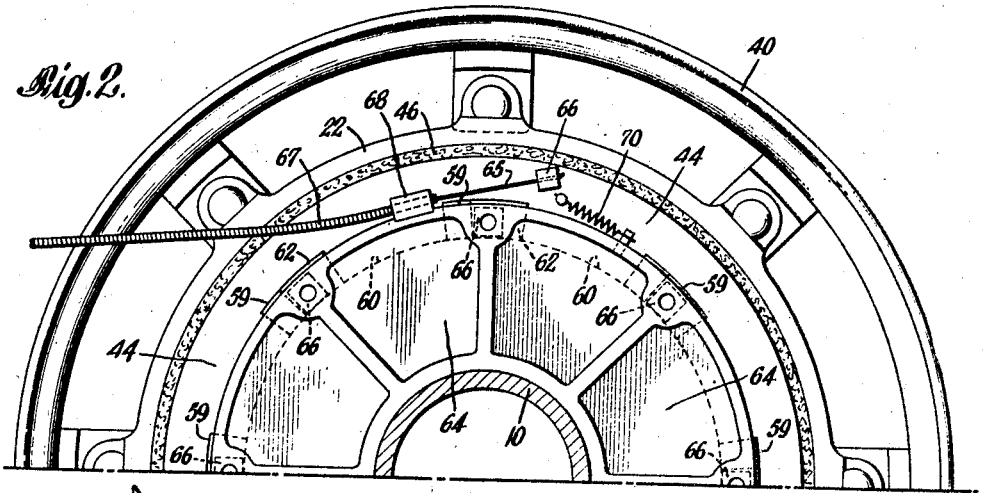
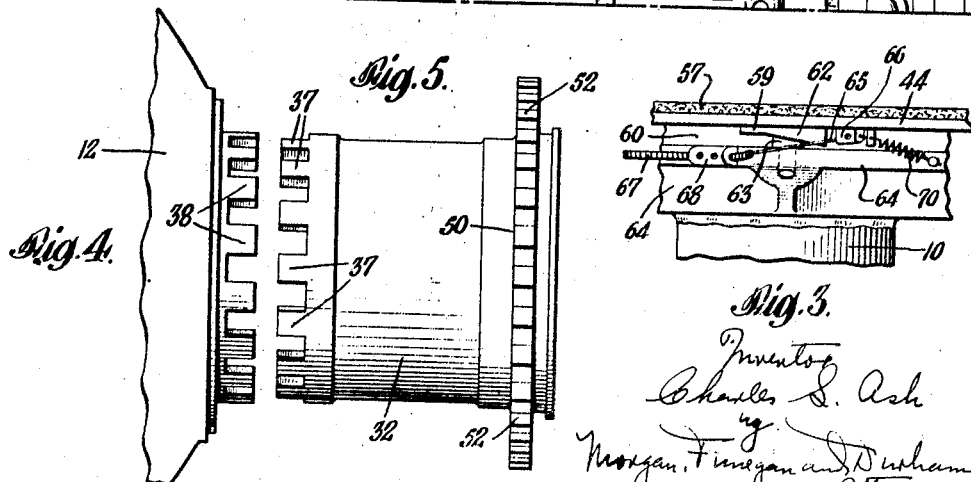
Inventor
Charles S. Ash
by
Morgan, Finnegan and Durham
Attys Patented Jan. 4, 1944

2,338,393

UNITED STATES PATENT OFFICE 2,338,393

DUAL WHEEL ASSEMBLY

Charles S. Ash, Milford, Mich.

Original application September 1, 1939, Serial No. 293,046, now Patent No. 2,293,097, dated August 18, 1942. Divided and this application January 7, 1941, Serial No. 373,387

6 Claims. (Cl. 301—36)

The present invention relates to dual wheel assemblies for automotive road vehicles and more particularly to a novel and improved construction of independently rotatable dual wheels and braking means therefor.

This application is a division of my copending application Serial Number 293,046, filed September 1, 1939, now matured into Patent Number 2,293,097, issued August 18, 1942.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

Of the drawing:

Figure 1 is a fragmentary vertical sectional view of a typical and illustrative embodiment of the invention, as applied to a dead or trailing axle;

Figure 2 is an end elevation looking from the inside of the vehicle and showing the assembly of Figure 1;

Figure 3 is a detailed fragmentary sectional view taken on the line 3—3 of Figure 1;

Figure 4 is a detailed plan view of a portion of the wheel mechanism shown in Figure 1; and Figure 5 is a detailed fragmentary plan view of a portion of the wheel mechanism shown in Figure 1.

The present invention has for its object the provision of a novel and improved dual wheel assembly in which the two wheels are independently rotatable. A further object of the invention is the provision of a dual wheel assembly, in which the two wheels are independently rotatable, which is of relatively simple construction and in which the parts are relatively small and easy to handle. Still another object is to provide such a dual wheel assembly which is easily and simply disassembled and assembled, and in which one wheel may be removed without disturbing the other wheel assembly. A further object is the provision of a hub and bearing assembly for a set of independently rotatable dual wheels which may be associated with braking means for the wheels which are at the same time compact and powerful and simple and relatively inexpensive.

In accordance with the present embodiment of the invention, showing the invention as applied to independently rotatable, non-driven wheels such as may be employed on a semi-trailer, the two wheels are mounted side-by-side for coaxial rotation about the spindle end of an axle, one of the wheels being provided with an elongated cylindrical hub portion on which the other wheel is rotatably journalled so that the two wheels may rotate independently of each other.

Attached to the inner side of the inner wheel is an annular brake disc which is a flat circular member of considerable width, while a second braking disc of somewhat the same width is attached to the outer wheel and is mounted for free axial movement by means of a splined portion formed internally of the disc and cooperating with a similarly splined portion attached to and fast with respect to the inner end of the hub of the outer wheel, so that the disc may move axially of the outer wheel but is held against rotational movement with respect thereto.

A third disc is located inwardly of the other two discs, so that the three discs are closely adjacent each other and are in coaxial relation and this third disc is mounted for free axial movement by means of cooperating splines but is supported on and restrained or held against rotation by the axle shaft. Suitable friction material is provided between the discs and is held to some of the discs so that the proper retarding effort may be exerted between the discs as they are pressed into firm contact with each other. Means are provided for exerting this pressure to cause the braking of both wheels, and these means may be of the servo or self-energizing type, or they may be directly and fully energized by power means or by the operator of the vehicle.

The elongated cylindrical hub portion is detachably connected with its wheel so that during normal use of the wheel assembly relative rotation of the wheel and hub is not permitted, and these parts are secured in this relationship at all times when the wheels are assembled for use. A bearing retaining nut is provided on the spindle end which may be removed and the outer wheel removed and disengaged from its hub portion without disturbing the hub portion or the other wheel which is rotatably journalled thereon.

Radial thrust bearings are located between the spindle end and the outer wheel and its elongated cylindrical hub, and an additional radial bearing is seated on the spindle end and engages both the hub of the outer wheel and the detachable cylindrical hub extension, thereby insuring the free rotation of the wheel and hub extension about the axle and preventing axial thrust, and at the same time allowing for the removal of the outer wheel without disturbing the other wheel and its bearing mounting The hub extension is provided at its inner end with an outwardly extending annular enlarged portion, and thrust bearings are located between this portion and the second wheel and between the hub of the first wheel and the second wheel to effectively provide against axial thrust of the second wheel.

It will be understood that the foregoing general description and the following detailed description as well, are exemplary and explanatory of the invention but are not restrictive thereof.

Referring now in detail to the illustrative embodiment of the invention as shown by the accompanying drawing, the dual wheel is shown as applied to an improved construction of dual wheels of the general type shown in my prior Patent No. 1,979,598. An axle end 10, such as may be used for a semi-trailer or third axle, has rotatably supported on it an outer wheel 12 by means of the outer tapered roller bearing 16 and an inner ball bearing 18 which are suitably seated in the hub portion 20 of the wheel. The inner wheel 22 is provided with a hub portion having an outer bearing ring 24 and an inner bearing ring 26 interconnected by the circumferentially spaced axially extending web portions 28. An anti-friction thrust bearing 30 is provided between the inner end of the outer wheel hub and the adjacent end of the inner wheel hub so as to permit easy relative rotation of the wheels under conditions of relatively heavy thrust.

The inner wheel is rotatably mounted for rotation about the axle end, as well as relatively to the outer wheel by means of a detachable hub extension 32 of generally cylindrical form which is provided at its outer end with a bearing seat also fitting over the outer race of ball bearing 18, and a bearing seat 34 which receives the inner tapered roller bearing 36. The hub extension 32 is provided at its outer end with relatively deep square teeth 37 which fit into and engage similar teeth 38 formed on the inwardly extending end of the outer hub 20 so as to prevent relative rotation of the hub sections, at the same time permitting their ready separation or assembly These parts are normally held in their assembled position by means of the bearings 16 and 36 and the bearing retaining nut 39 at the end of the axle spindle The hub extension 32 is provided at its inner end with the outwardly extending annular rim 50 and this portion faces with the bearing ring 26 of the inner wheel 22.

With the construction shown it will be apparent that the bearing retaining nut 39 may be removed from the spindle end 10, and the outer wheel 12 then disengaged from its hub extension 32 and removed without disturbing any part of the assembly of the inner wheel 22 upon the spindle. It will likewise be apparent that thrust bearings 30 and 26 will hold the inner wheel 22 against axial thrust whatever the axial pressure exerted upon it when the assembly is in use. Radial thrust bearings 16 and 36 will likewise maintain the outer wheel 12, the hub extension 32, and thus the inner wheel assembly, in a stable axial position under similar conditions, as well as provide for the free rotation of those members about the axle spindle end 10.

The pneumatic tires are mounted on the wheels by means of the rims 40 which are suitably attached to the wheels in any desired manner.

The braking mechanism is that shown in my copending application Serial No. 293,046, filed September 1, 1939, and comprises three annular discs 42, 43 and 44. Disc 42 comprises a stiff flat steel backing plate of considerable width and supported between the larger inner portion of the wheel 22 and the bearing portion 26 in a plane normal to the axle, and is seated and held against rotation within the shoulders formed in these parts by means of the screws 45. On its inward face, the backing plate is provided with an annular ring of friction material, such as brake lining, 46 which is firmly secured to the plate in any desired manner.

The annular rim 50 of the hub extension 32 extends radially close to the bearing portion 26 of the inner wheel, the teeth 52 on this rim being spur gear teeth of substantially rectangular shape. Mounted on the toothed exterior of the rim 50 is an annular disc 43 provided with interfitting teeth 56 which permit axial movement of the disc 43 but do not allow any relative rotation between the disc 43 and the rim 50. The disc 43 and the plate 42 are preferably of the same general size so that the disc 43 may make full contact with all the surface of the disc 42 to give the maximum possible friction between them. Disc 43 is made of steel or cast iron and is smooth on both sides.

For creating pressure between the discs 42 and 43 and for simultaneously applying a braking force to both of the wheels, a third disk 44 is provided inwardly of the disc 43 and is provided with a surface of brake lining or other friction material 57 on its face adjacent the disc 43. Disc 44 is rotatably mounted for limited rotation about the axle 10 by means of a plurality of lugs 59 fitted to rotate on an annulus 60 formed on the outer face of a support bracket 64 supported on and fast with respect to the axle, annulus 60 being provided with a radial face against which rests the inward side of the disc 44.

The inward face of lugs 59 is provided with a tooth 62 having an inclined face which cooperates with an inclined tooth 63 equidistant from the axle and fixed to the supporting bracket 64 at a plurality of points corresponding to those of lugs 59 so that as the disc 44 is rotated slightly, it is moved axially into contact with the disc 43 and thereby forces the disc 43 into frictional braking contact with the disc 42, the extent of the braking being dependent upon the pressure between the discs 42, 43 and 44 which in turn is dependent on the extent of rotation of the disc 43.

Means are provided for rotating the disc 44 for applying the brake and illustratively comprise the cable 65 which is fastened at one end to the disc 44 by means of the eye 66, while the cable sheath 67 is fastened to the brake anchor by means of the clamp 68. Suitable spring means are provided for reversely moving the brake disc 44 to release the brake and may comprise the spring 70 in tension between the brake disc 44 and the supporting bracket.

As the brake disc 44 is rotated to move it axially closer to the discs 43 and 42, the brake disc 44 first engage the disc 43 and continued movement forces disc 43 axially into engagement with the disc 42, thereby creating a drag or retarding force on the wheels. At the same time, the continued rotation of the disc 43, caused by the rotation of the outer wheel, tends to rotate the brake disc 44 and thereby moves the disc 44 rotationally causing a further axial movement of the disc so as to increase the braking force on both the wheels.

Figures 1 to 3 show the installation as applied to the wheels at the right side of the vehicle, and on the left side, the wheels and braking means will be duplicated, except that the cooperating inclined faces will be reversed so as to cause an increased brake application as the vehicle moves forward with the brakes applied.

It will be apparent that the present invention may be utilized with a non-servo type of brake, and with other designs of brakes either servo or non-servo of the general type shown and described herein and in my copending application Serial Number 293,046, filed September 1, 1939, without departing from the scope of the invention.

The invention in its broader aspects is not limited to the specific mechanisms shown and described but departures may be made therefrom within the scope of the accompanying claims without departing from the principles of the invention and without sacrificing its chief advantages.

What I claim is:

1. A dual wheel assembly including in combination a wheel, an axle on which the wheel is rotatably mounted, a tubular hub extension rotatably mounted on the axle, interengaging toothed members connecting the wheel and extension and a second wheel rotatably journalled on the extension.

2. A dual wheel assembly including in combination an axle end, an anti-friction bearing on the axle end, an anti-friction radial thrust bearing on either side of the first bearing, a wheel mounted by the intermediate bearing and one of the anti-friction radial thrust-bearings, a detachable extension fast to the wheel and mounted by the intermediate and the other anti-friction radial thrust bearing and a second wheel rotatably journalled on the extension.

3. A dual wheel assembly including in combination a wheel, a tubular extension projecting from the hub of the wheel and fast thereto, an enlarged portion on the extension, a second wheel journalled on the extension for independent relative rotation with respect to the first wheel, and a thrust bearing on either side of the second wheel between the hub and the enlarged portion.

4. A dual wheel assembly including in combination a wheel, a tubular extension projecting from the hub of the wheel, interengaging teeth on the wheel hub and extension for preventing relative rotation therebetween, an enlarged portion on the extension, a second wheel rotatably journalled on the extension, and a thrust bearing on either side of the second wheel between the hub and the enlarged portion.

5. A dual wheel assembly including in combination an axle end, an anti-friction bearing on the axle end, an anti-friction radial thrust bearing on either side of the first bearing, a wheel mounted by the first bearing and one of the anti-friction radial thrust bearings, a tubular detachable extension fast to the hub of the wheel and mounted by the first bearing and the other anti-friction radial thrust bearing, an enlarged portion on the extension, a second wheel rotatably journalled on the extension, and a thrust bearing on either side of the second wheel between the hub of the first wheel and the enlarged portion.

6. A dual wheel assembly including in combination an axle end, an anti-friction bearing on the axle end, an anti-friction radial thrust bearing on either side of the first bearing, a wheel mounted by the first bearing and one of the anti-friction radial thrust bearings, a tubular extension projecting from the hub of the wheel and mounted by the first bearing and the other anti-friction radial thrust bearing, interengaging teeth on the wheel hub and extension for preventing relative rotation therebetween, an enlarged portion on the extension, a second wheel rotatably journalled on the extension, and a thrust bearing on either side of the second wheel between the hub of the first wheel and the enlarged portion.

CHARLES S. ASH.